(No Model.)

M. L. DERICK.
GOSSAMER RUBBER FABRIC.

No. 375,478. Patented Dec. 27, 1887.

WITNESSES.
J. M. Dolan.
Fred. B. Dolan.

INVENTOR.
Myron L. Derick
by his attys
Clarke & Raymond

UNITED STATES PATENT OFFICE.

MYRON L. DERICK, OF BOSTON, ASSIGNOR TO WILBUR F. BRIGHAM, TRUSTEE, OF HUDSON, MASSACHUSETTS.

GOSSAMER RUBBER FABRIC.

SPECIFICATION forming part of Letters Patent No. 375,478, dated December 27, 1887.

Application filed March 28, 1887. Serial No. 233,075. (No model.)

*To all whom it may concern:*

Be it known that I, MYRON L. DERICK, of Boston, in the county of Suffolk and State of Massachusetts, a citizen of the United States, have invented a new and useful Improvement in Gossamer Rubber Fabrics, of which the following is a full, clear, and exact description, reference being had to the accompanying drawings, forming a part of this specification, in explaining its nature.

The invention relates to a gossamer rubber fabric which comprises a closely-woven base covered with a water-proof composition, upon which are raised stripes or figures of water-proof composition of any desired color, and which are finished upon their upper surface with the so-called "electric finish."

Figure 1:
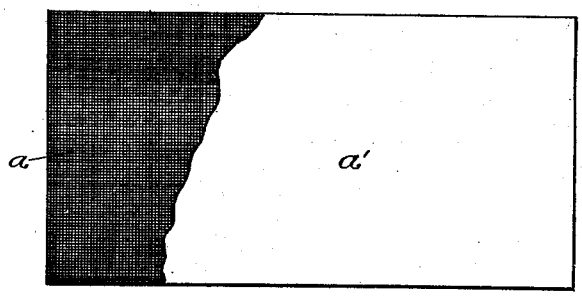
Figure 2:
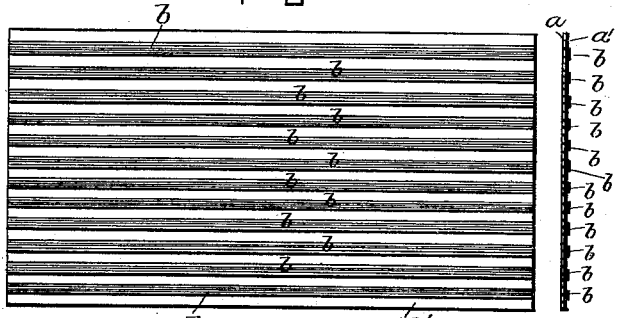
Figure 3:
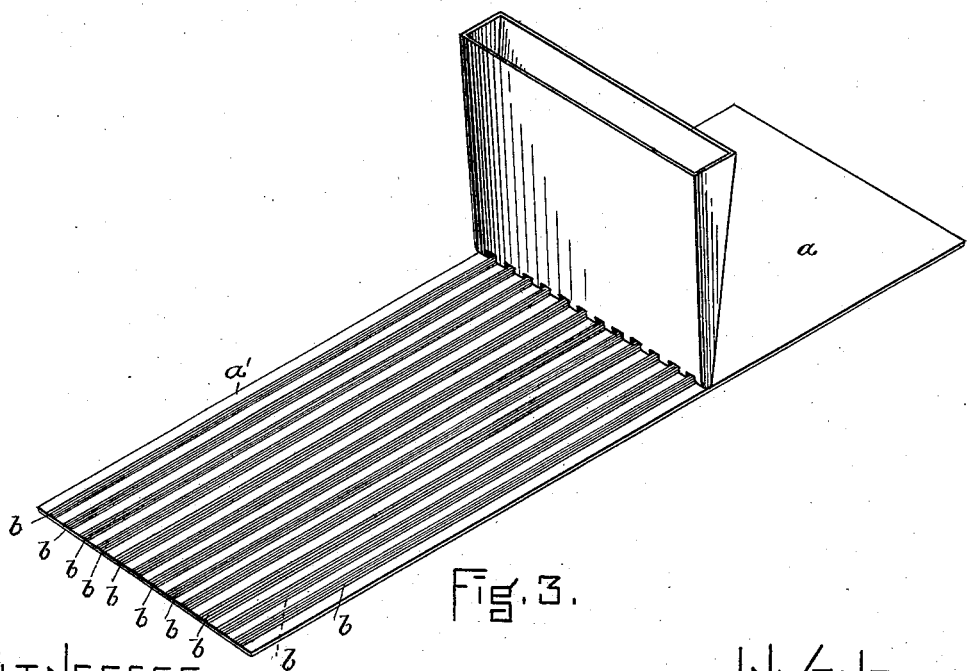

Referring to the drawings, Figure 1 represents a view of the fabric coated with rubber, but before the raised stripes or design has been added. Fig. 2 is a view showing the raised stripes or design. Fig. 3 is a view representing the device for applying the ornamental stripes.

In practicing the invention I take a closely-woven fabric, $a$, for the base. Upon this I apply, by mechanism well known to manufacturers of gossamer rubber goods, a number of coatings of the usual rubber water-proof composition and of any desired color or tint. I then apply to the rubber-coated fabric powdered corn-starch, which is rolled into the rubber coating while plastic or soft, and I then run a coating of naphtha over the entire surface of the goods. This produces a surface, $a'$, which is not "sticky" or "tacky," as it is sometimes called. To the goods as thus prepared I then apply in any desirable way, but preferably by the feeding or applying trough, such as is shown in Fig. 3, when it is desired to make striped goods, and which is adapted to hold the composition, and having holes in its bottom, through which the composition is delivered to the surface of the goods, an adhesive composition, preferably of rubber of any desired color, and which, before it is cured, becomes attached by its adhesiveness to the finished surface of the goods. The applying device, as represented in Fig. 3, is used in the manufacture of line or striped goods. I then apply to the surface of the goods powdered potato-starch, which, however, adheres and is attached to the rest of the stripes, lines, or sections of the goods, and not to the sunken parts thereof, so that only the raised stripes or lines are provided with the electric finish. The product is a gossamer rubber cloth having raised figures or stripes $b$, of any color, finished with the electric finish. The fabric as thus prepared is then cured in any of the well-known ways.

Having thus fully described my invention, I claim and desire to secure by Letters Patent of the United States—

As an improved article of manufacture, a gossamer rubber cloth comprising a closely-textured base covered upon one surface with a water-proof composition, having raised lines, stripes, or other designs thereon in any color, which raised sections are surface-finished with powdered potato-starch or other equivalent material, as and for the purposes specified.

MYRON L. DERICK.

In presence of—
F. F. RAYMOND, 2d,
FRED. B. DOLAN.